Figure 1:
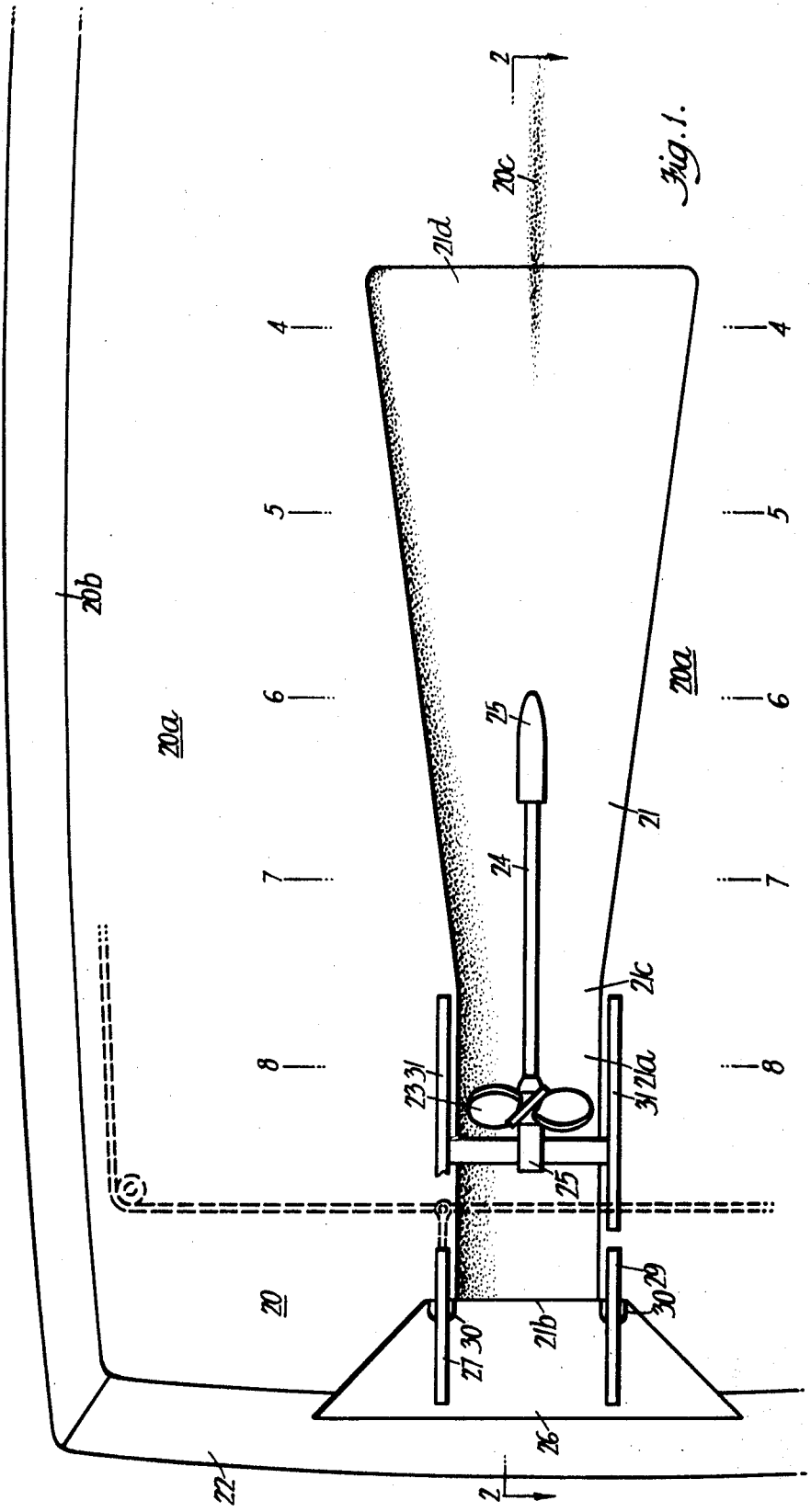

United States Patent [19]
Gibbins

[11] 3,744,446
[45] July 10, 1973

[54] PROPELLER DRIVEN BOATS
[76] Inventor: Frank Billington Gibbins, 297 Boundary Road, Mordialloc, Victoria, Australia
[22] Filed: Dec. 23, 1971
[21] Appl. No.: 211,552

[30] Foreign Application Priority Data
Dec. 24, 1970 Australia.................................. 3599

[52] U.S. Cl.............................. 115/39, 9/6, 114/61
[51] Int. Cl............................................... B63h 5/06
[58] Field of Search........................ 244/39, 34, 35; 9/6; 114/61

[56] References Cited
UNITED STATES PATENTS
3,469,557 9/1969 Wollard ............................... 115/39
3,515,087 6/1970 Stuart ............................... 115/39 X Primary Examiner—Duane A. Reger
Assistant Examiner—C. A. Rutledge
Attorney—Oberlin, Maky, Donnelly & Renner

[57] ABSTRACT

The hull of a propeller driven planing boat powered by an inboard engine is provided on the underside thereof with a channel extending longitudinally of the hull from the stern towards the bow, with the channel being of maximum depth at the stern to accommodate a propeller therein adjacent the stern, said channel widening and becoming shallower until it merges with the hull surface, and with the cross-sectional perimeter of the channel being of the same length along the length of the channel so that the surface area of the channel remains constant as a wetted area throughout the length of the channel. This provides a contour of the channel adapted to ensure that water will flow, during motion of the hull, through the channel without producing eddy currents, cavitation, aeration or other fluid flow effects likely to affect the operating efficiency of the propeller in the channel.

8 Claims, 10 Drawing Figures

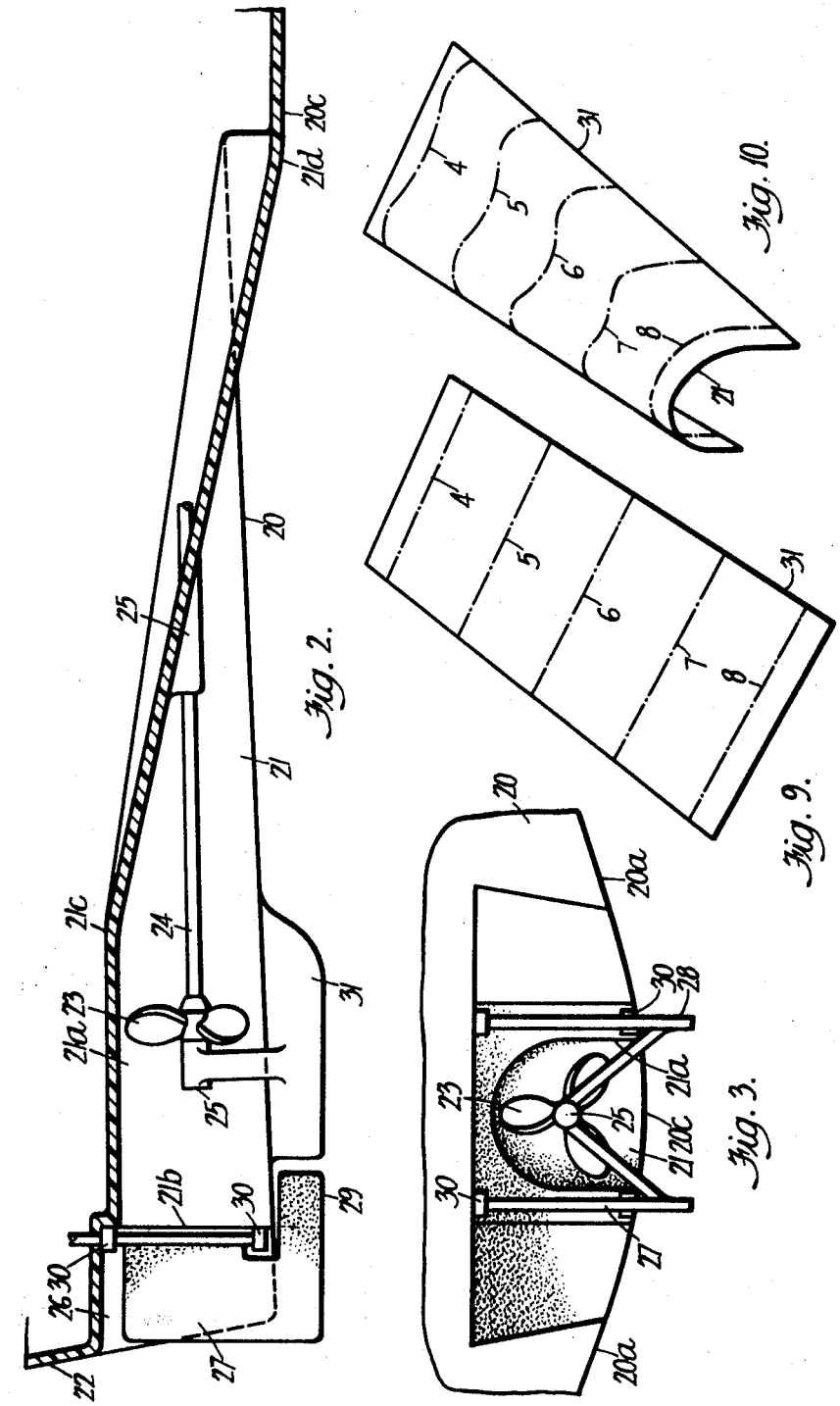

PROPELLER DRIVEN BOATS

This invention relates to high speed propeller driven planing boats powered by an inboard engine.

In boats of this type the protection of the propeller from damage by floating objects or grounding of the boat has created a number of problems and in attempting to solve this problem it his been proposed to guard or shield the propeller or include the propeller in a tunnel formed in the boat hull. These proposals have the disadvantage that the efficiency of the propeller is so seriously affected that they are not acceptable to boat builders.

The principal object of the present invention is to provide a boat hull construction whereby the propeller or propellers is or are substantially protected by the boat hull and in such manner as not to affect the operating efficiency of the propeller or propellers.

With the above sated object in view a boat hull, according to the present invention is provided on the underside thereof with a channel extending longitudinally of the hull from the stern towards the bow, with the channel being of maximum depth at the stern to accommodate a propeller therein adjacent the stern, said channel widening and becoming shallower until it merges with the hull surface and with the cross-sectional perimeter of the channel being of substantially the same length along the length of the channel.

The surface area of the channel when plotted onto a plane surface resolves into a rectangle having a width equal to or substantially equal to the widest part of the channel at the forward end thereof and of a length greater than the width, so that the surface area of the channel remains constant as a wetted area throughout the length of the channel.

In the case of a single propeller hull the axial plane of the channel aligns with that of the keel and in the case of a twin propeller hull the channel for each propeller is positioned on each side of the keel.

Viewing the channel from the forward end to the stern end thereof, the width of the channel decreases and the depth of the channel increases over a substantial part of its length.

The contour of the channel is adapted to ensure that water will flow, during motion of the hull, through the channel at all rates without producing eddy currents, cavitation or aeration or other fluid flow effects likely to affect the operating efficiency of the propeller in the channel.

The forward end of the channel is preferably rearwardly of the planing area of the boat hull to thereby avoid the likelihood of aeration of water entering the channel to reduce operational efficiency of the propeller.

In order that the invention may be more readily understood reference will now be made to the accompanying drawings illustrating a boat hull constructed in accordance with the present invention.

In these drawings:

FIG. 1 is an underside plan of the stern portion of a single propeller boat hull incorporating a channel constructed according to the invention, FIG. 2 is a section on line 2 — 2 of FIG. 1, FIG. 3 is a rear elevation of that part of the boat hull shown in FIG. 2, FIG. 4, 5, 6, 7 and 8 are diagrammatic sections on correspondingly numbered section lines on FIG. 1 showing the development of the channel from the bow towards the stern, and FIG. 9 is a diagrammatic representation in perspective of the channel plotted onto a plane surface and FIG. 10 is that representation shaped in the form of the channel, the broken lines corresponding to the sections shown in FIGS. 4 to 8.

FIGS. 1, 2 and 3 illustrate the relevant parts of a single propeller, inboard engined, boat hull 20 having incorporated therein on the underside a channel 21 constructed according to the present invention.

Figure 8:
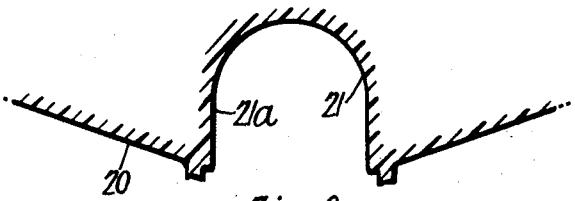

The channel 21 extends forwardly from the stern 22 and longitudinally of the hull and at the stern is substantially hemi-spherical in cross-section at the end section 21a as shown in FIGS. 3 and 8. The section 21a is of a maximum depth to embrace the propeller 23 positioned in that section 21a on the end of shaft 24 which is supported in the usual manner by bearings 25. The length of section 21a of the channel 21 is not arbitary, it may terminate immediately rearwardly of the propeller 23, however, in the embodiment illustrated the stern and termination 21b of the section 21a is in a stern recess 26 accommodating twin rudders 27 and 28 each of which are disposed on either side of the channel end 21b.

The rudders 27 and 28 each have portions 29 extending below the hull and forwardly of their pivot bearings 30, said extensions 29 increasing the steering surfaces of the rudders and also providing reverse acting forces which reduce the forces necessary for operation of the rudders during movement of the boat in the water. Guard fins 31 are provided on the hull forwardly of the rudder extensions 29 to deflect floating or other objects and thereby prevent damage to the rudders.

From the inner or forward end 21c of channel section 21a the channel 21 extends forwardly towards the bow of the hull becoming wider and shallower until at the forward end 21d it merges with the underside surface contour of the boat hull at a point rearwardly of the planing area of the boat hull.

Figure 4:
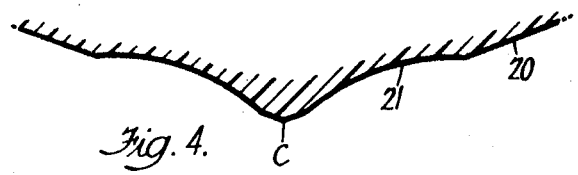
Figure 5:
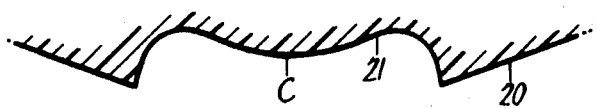
Figure 6:
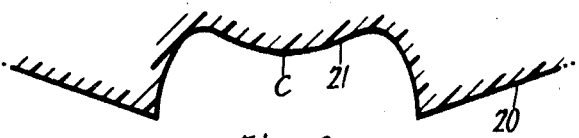
Figure 7:
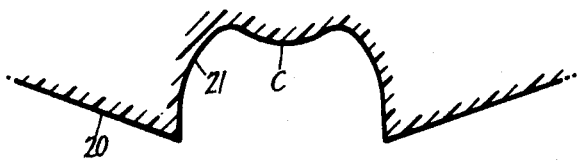

The boat hull, as illustrated, is of the type in which the bottom of the boat is formed of two inclined sections 20a extending from the boat sides 20b towards the keel 20c as shown in FIGS. 1, 2 and 3 and while the forward end 21d of the channel 21 is shown, for convenience of illustration, as terminating in a defined line, it will be apparent, more particularly from the section shown in FIG. 4 that the channel merges into the contour of the hull surfaces at this point to provide a surace offering no obstruction to the flow of water when the boat is in motion in the water.

The channel 21 as shown in the progressive sections in FIGS. 4 to 8, is so formed and dimensioned that the dimension of the cross-sectional perimeter of the channel section at 21a is the same or at least substantially the same at any cross-sectional point throughout its length. This is illustrated in FIGS. 9 and 10 where the rectangle 31 represents the channel 21 plotted onto a plane surface, the broken lines 4, 5, 6, 7 and 8 thereon representing the correspondingly numbered section lines on FIG. 1. The rectangle 31 represents the surface area of the channel with the width equal to the widest part of the channel and of a length greater than the width so that the surface area of the channel remains constant as a wetted area throughout the length of the channel. FIG. 10 represents that plane rectangle 31 of FIG. 9 shaped and contoured into the form of the channel, the broken lines shown thereon corresponding to those on FIG. 9 and showing the contour of the channel 21 from the deeper and narrower end to the wider and shallower end.

It is essential that the channel be formed and dimensioned as above described which ensures that as the craft is moving through the water the channel has a constant water volume flow therethrough and such flow is not subjected to turbulence or eddy currents which would affect the efficient operation of the propeller in the said water flow. Should forward end of the channel extend further forward than the planing area of the hull, that is, at a point above contact with the water when the craft is planing, it is believed, that aeration or cavitation of the water flow through the channel would occur and thereby reduce the efficiency of operation of the propeller.

In the development of the single channel 21 illustrated which is axially aligned with the keel 20c it is necessary to merge the keel formation into the channel which merging is shown as the convex formations at c in FIGS. 4, 5, 6 and 7, such formations C constituting part of the channel as a whole and do not divide the channel into separate channels.

The same form of channel may be provided in a twin propeller craft, a separate channel, having the above described characteristics, being provided for each on each side of the keel.

The channel section 21a forms an open sided channel or tunnel for the propeller operating therein giving protection therefor against grounding of the hull or objects floating in the water while at the same time the surface area of the channel being constant throughout its length the water flow through the channel does not affect the efficiency of the propeller operating therein.

The channel in the hull may be made of any suitable material but the contour of the channel or channels may be readily incorporated in fiber glass reinforced resin boat hulls.

What I claim is:

1. A boat hull including on the underside thereof a channel extending longitudinally of the hull from the stern towards the bow, the channel being of maximum depth at the stern, a propeller supported to operate in said maximum depth section of the channel, said channel widening and becoming shallower until at its forward end it merges with the hull surface, and with the cross-sectional perimeter of the channel being of the same length at all points along the length of the channel.

2. A boat hull as claimed in claim 1 and wherein the maximum depth section of the channel is mainly hemispherical in cross-section and from this section progressively widens and becomes shallower and at its forward end it is widest and shallowest to merge with the boat hull surface.

3. A boat hull as claimed in claim 2 and wherein the surface area of the channel when plotted onto a plane surface resolves into a rectangle having a width equal to the widest part of the channel and a length greater than the width so that the channel surface area remains constant as a wetted area throughout the length of the channel.

4. A boat hull as claimed in claim 1 and wherein the channel for a single propeller craft is in axial alignment with the keel of the boat.

5. A boat hull as claimed in claim 1 and wherein a channel is provided on each side of the keel and parallel thereto for a twin propeller craft.

6. A boat hull as claimed in claim 1 and wherein twin rudders are provided one on each side of the stern end of the channel said rudders having portions extending forwardly of the rudder pivot bearings, said portions increasing the operating faces of the rudders and also provide reverse acting forces assisting operation of the rudders during movement of the boat in the water.

7. A boat hull including on the underside thereof a channel extending longitudinally of the hull from the stern towards the bow, a maximum depth section of the channel at the stern end thereof, a propeller supported to operate in said maximum depth section which is hemi-spherical at its base and of a depth at least equivalent to the propeller diameter, said channel forwardly of the propeller becoming wider and shallower until at its forward end it merges with the hull surface, and with the contours of the channel having arranged so that the cross-sectional perimeter of the channel is of the same length at all points along the length of the channel.

8. A boat hull as claimed in claim 7 and wherein is positioned at an intermediate point in the maximum depth section of the channel.

* * * * *